United States Patent
Dry et al.

(10) Patent No.: US 7,108,825 B2
(45) Date of Patent: Sep. 19, 2006

(54) MULTI-SHOT MOLDING METHOD AND ASSEMBLY

(75) Inventors: Alan G. Dry, Grosse Pointe Woods, MI (US); Michael P. Schoemann, Waterford, MI (US); Thomas W. Spanos, Chesterfield, MI (US); John D. Youngs, Southgate, MI (US); Michael W. Moran, Highland, MI (US); Eric S. Mozer, Rochester, MI (US); Richard J. Trombley, Clarkston, MI (US)

(73) Assignee: Lear Corporation, Southfield, MI (US)

( * ) Notice: Subject to any disclaimer, the term of this patent is extended or adjusted under 35 U.S.C. 154(b) by 93 days.

(21) Appl. No.: 10/640,157

(22) Filed: Aug. 13, 2003

(65) Prior Publication Data

US 2005/0037105 A1 Feb. 17, 2005

(51) Int. Cl.
B29C 45/16 (2006.01)

(52) U.S. Cl. .............................. 264/328.7; 264/328.8; 264/250; 264/255; 264/259

(58) Field of Classification Search ............. 264/328.7, 264/328.8
See application file for complete search history.

(56) References Cited

U.S. PATENT DOCUMENTS

| | | | |
|---|---|---|---|
| 4,155,972 A | | 5/1979 | Hauser et al. |
| 4,460,534 A | | 7/1984 | Boehm et al. |
| 4,576,560 A | * | 3/1986 | Herman ....................... 425/103 |
| 5,618,485 A | * | 4/1997 | Gajewski ..................... 264/255 |
| 6,413,460 B1 | * | 7/2002 | Wisniewski et al. ........ 264/254 |
| 2003/0001411 A1 | | 1/2003 | Gedritis et al. |
| 2003/0069612 A1 | | 4/2003 | Zart et al. |

FOREIGN PATENT DOCUMENTS

| | | |
|---|---|---|
| CA | 2 435 231 | 1/2004 |
| DE | 198 00 828 | 7/1999 |
| WO | 94/21440 | 9/1994 |

* cited by examiner

Primary Examiner—Michael P. Colaianni
Assistant Examiner—Monica A. Huson
(74) Attorney, Agent, or Firm—MacMillan, Sobanski & Todd, LLC

(57) ABSTRACT

A mold assembly for forming a multi-shot molded part includes a mold system defining a mold cavity, and a retracting member disposed in the mold system selectively movable between extended and retracted positions in the mold cavity. A first molding material is injected in the mold cavity when the mold system is in a configuration with the retracting member in the extended position, forming a first portion of a molded part including a thin wall portion. A second molding material is injected in the mold cavity when the mold system is in another configuration with the retracting member in the retracted position, forming a second portion of the molded part and providing open cavity portions adjacent both surfaces of the thin wall portion. The second material penetrates the thin wall portion, filling the open cavity portions and forming a connection between the first and second portions of the molded part.

19 Claims, 3 Drawing Sheets

MULTI-SHOT MOLDING METHOD AND ASSEMBLY

BACKGROUND OF THE INVENTION

The present invention relates generally to molding and injection molding equipment and processes and, in particular, to a multi-shot molding method and assembly.

Molding and injection molding equipment are well known and typically include a mold having a mold cavity for receiving molten liquid therein for forming a finished molded part, such as automobile door interiors or the like. Multi-shot molding is also well known and typically includes the steps of injecting a first pressurized molten mold material into a mold cavity, retracting a portion of the mold (such as a large core, a small core, a blade, or a lifter) into the core or the cavity, and injecting at least a second pressurized molten mold material into the mold cavity to form a finished part formed of the first and second mold materials. Injection molding equipment typically utilize retractable, often tapered, pins for providing a means for attaching the first and second mold materials. The pin extends through the first mold material and is retracted, along with the retracting portion, prior to the second mold material being injected to form a connection, such as a welded connection, between the mold materials. The pin fully penetrates through the first material and contacts a surface of the core portion adjacent the mold cavity. Eventually, a witness mark is disadvantageously formed on the surface of the core portion that, in turn, becomes a blemish on a surface of the finished molded part.

It would be desirable, therefore, to provide an assembly and method for forming multi-shot molded parts that does not produce a witness mark on a surface of the finished molded product and that ensures proper attachment of the multiple shot components formed in the multi-shot molding process.

SUMMARY OF THE INVENTION

The present invention concerns a mold assembly and method for forming a multi-shot molded part. The mold assembly includes a mold system defining a mold cavity therein, and at least one retracting member disposed in the mold system selectively movable between extended and retracted positions in the mold cavity. A first molding material is injected in the mold cavity when the mold system is configured in a first configuration with the retracting member in the extended position, forming a first portion of a molded part including a thin wall portion adjacent the retracting member. A second molten molding material is injected in the mold cavity when the mold system is configured in the second configuration with the retracting member in the retracted position, forming a second portion of the molded part. The second configuration provides open cavity portions adjacent both surfaces of the thin wall portion and the second molding material penetrates the thin wall portion, filling the open cavity portions and forming a connection between the first and second portions of the molded part.

The assembly and method in accordance with the present invention is suitable for parts to be formed of "weld compatible" materials (materials that each have substantially equal melting points), including, but not limited to, plastic materials such as polyvinyl chloride, thermoplastic olefins, thermoplastic elastomers, polypropylene and the like. The weld compatible materials may be the same material or dissimilar materials that are weld compatible. The assembly and method is also suitable for parts made of dissimilar weld compatible materials wherein the materials are known to form a poor chemical bond, and where only a mechanical lock is practical, including, but not limited to, nylon and polypropylene, acrylonitrile butadiene sytrene (ABS) and polypropylene, polycarbonate ABS and polypropylene or other known material combinations.

The present invention provides the ability to attach multi-shot part portions together regardless of the types of materials utilized in the injection molding process by utilizing a molding system of preferably tapered retracting members without the retracting members leaving a witness mark on the exterior surface of the injection molded part.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 7 is a partial cross sectional view of an alternative embodiment of a molding assembly in accordance with the present invention shown in a first configuration with a first molding material; and.

DESCRIPTION OF THE PREFERRED EMBODIMENT

Figure 1:
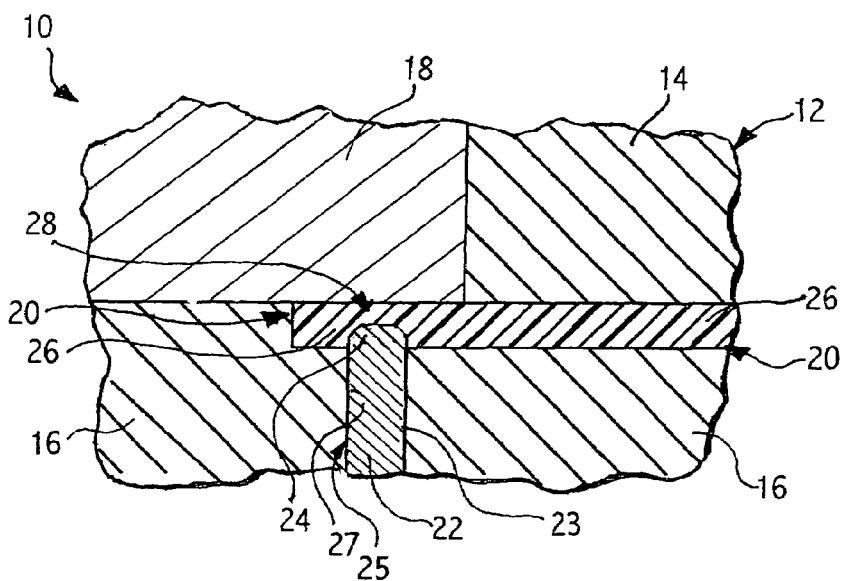
FIG. 1 is a fragmentary cross sectional view of a molding assembly in accordance with the present invention shown with in a first configuration a first molding material.

Referring now to FIGS. 1 through 5, a molding assembly in accordance with the present invention is indicated generally at 10. The molding assembly 10 includes a mold system 12 having a first portion 14, a second portion 16, and a third portion 18 that is retractably or slidably disposed in the mold system 12 relative to the first portion 14 and second 16 portion. The mold system 12 is preferably formed of steel, cast iron, or the like. The portions 14, 16, and 18 are stationary portions of the mold system 12 that define a mold cavity 20 therebetween. The mold system 12 and the mold cavity 20 are preferably components of an injection molding machine for producing injection molded parts or the like, discussed in more detail below. The mold system 12 includes a pin 22 that is retractably disposed in the second portion 16. A free end 24 of the pin 22 extends into the mold cavity 20. The boundaries of the mold cavity 20, therefore, are set by the surfaces of the portions 14, 16, and 18, and the free end 24 of the pin 22 adjacent the mold cavity 20.

In FIG. 1, the mold assembly 10 is shown in a first configuration with the pin 22 in an extended position and the third portion 18 in a non-retracted position. In the first configuration, the free end 24 and the third portion 18 do not quite come in contact. A preferred spacing between the free end 24 of the pin 22 and the third portion 18 is in the range of from about 0.003 inches to about 0.010 inches. Alternatively, the spacing between the free end 24 of the pin 22 and the third portion 18 may be in the range of from 0.001 inches to about 0.040 inches.

A first pressurized mold material 26 is injected in a molten state into the mold cavity 20 by an injector (not shown) or the like. The boundaries of the first mold material 26 are set by the surfaces of the portions 14, 16, and 18, and the free end 24 of the pin 22, adjacent the mold cavity 20. A thin wall portion 28 of the first mold material 26 is formed adjacent the free end 24 of the pin 22 having a thickness corresponding to the spacing between the free end 24 of the pin 22 and the third portion 18. The molten first mold material 26 solidifies and occupies the mold cavity 20 to form a first portion of the injection molded part.

Best seen in FIG. 1, the pin 22 is disposed in a retracting member cavity 25. Preferably an interior surface 27 of the retracting member cavity 25 is treated to have a one of an improved lubricity property, an increased metal hardness property, and a reduced metal hardness property relative to an exterior surface 23 of the pin 22 for reducing wear between the surface 27 and the pin 22 and to increase the operational life of the mold system 12. Alternatively, an exterior surface 23 of the pin 22 is treated to have a one of an improved lubricity property, an increased metal hardness property, and a reduced metal hardness property relative to the interior surface 27 of the retracting member cavity 25 for reducing wear between the surface 23 and the pin 22 and to increase the operational life of the mold system 12. Alternatively, the pin 22 is a blade or any other type of retracting member operable to form a connection between portions of a molded part, discussed in more detail below.

Figure 2:
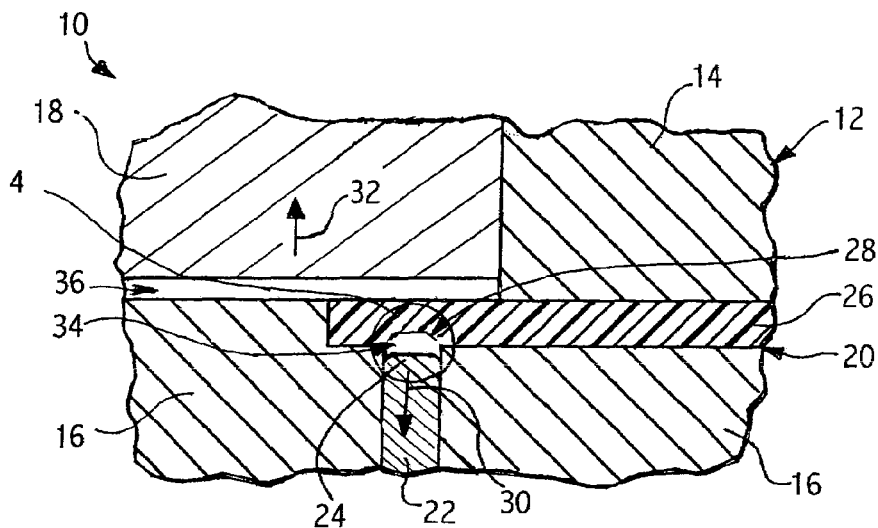
FIG. 2 is a fragmentary cross sectional view of the molding assembly in FIG. 1 shown in a second configuration.

In FIG. 2, the molding apparatus 10 is shown in a second configuration after the first mold material 26 has at least partially solidified. The pin 22 is retracted away from the first mold material 26 in a retracting direction 30, and the third portion 18 is retracted away from the first mold material 26 in another retracting direction 32. The first mold material 26 is held in place by the portions 14 and 16 of the mold system 12. When the pin 22 is retracted from the first mold material 26, an open cavity or void 34 is formed between the free end 24 of the pin 22 and the thin wall portion 28. When the third portion 18 is retracted from the first mold material 26, a second open cavity portion 36 of the mold cavity 20 is formed, which further exposes the thin wall portion 28 of the first mold material 26 to the second portion 36 of the mold cavity 20. The boundaries of the second portion 36 of the mold cavity 20, therefore, are defined by the surfaces of the first portion 14, the second portion 16, and the third portion 18, and by an upper surface of the first mold material 26 adjacent the second portion 36 of the mold cavity 20. The thin wall portion 28 of the first mold material 26 in the second configuration, therefore, is exposed on the upper surface to the second open cavity portion 36 of the mold cavity 20 and on a lower surface to the open cavity or void 34.

Figure 3:
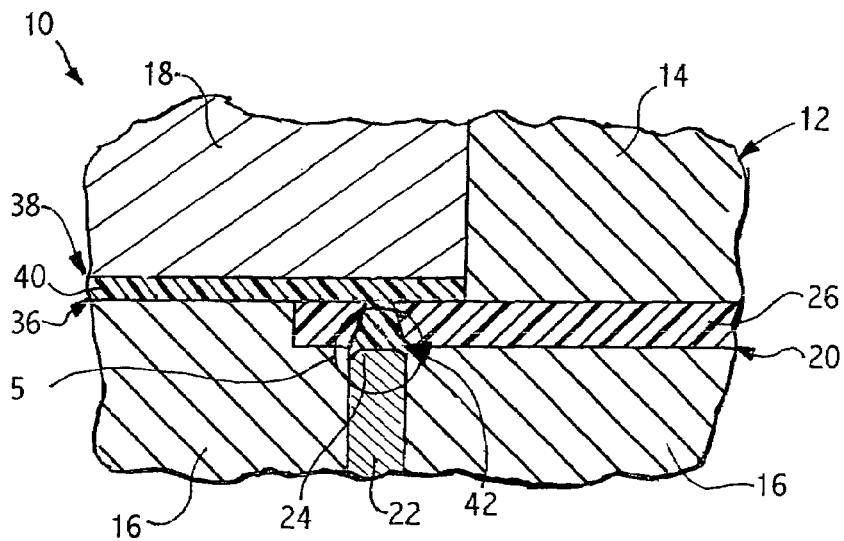
FIG. 3 is a fragmentary cross sectional view of the molding assembly shown in FIG. 2 shown with a first and second molding material.

In FIG. 3, the molding apparatus 10 is shown having an injection molded part 38, discussed in more detail below, disposed therein. A second pressurized mold material 40 is injected in a molten state into the second portion 36 of the mold cavity 20 by an injector (not shown) or the like. The boundaries of the second mold material 40, therefore, are defined by the surfaces of the first portion 14, the second portion 16, and the third portion 18 and by the upper surface the first mold material 26 adjacent the second open cavity portion 36 of the mold cavity 20. When the second mold material 40 is injected into the second portion 36 of the mold cavity 20, the pressure and temperature of the second mold material 40 causes penetration and/or melting of the thin wall portion 28 of the first mold material 26, thereby filling both the void 34 and the second portion 36 of the mold cavity 20 with the second mold material 40. The molten second mold material 40 solidifies and occupies the second portion 36 mold cavity 20 to form a second portion of the injection molded part 38. By penetrating and/or melting the thin wall portion 28, a connection, indicated generally at 42, is created between the first mold material 26 and the second mold material 40, which forms the injection molded part 38. Optionally, another core member (not shown) such as the third portion 18 or a similar member can be retractably disposed in the mold system 12 to assist in providing another portion of the mold cavity 20 for a third mold material (not shown).

In one preferred embodiment, the first mold material 26 and the second mold material 40 are the same material. Preferably, the first mold material 26 and the second mold material 40 are, but are not limited to, plastic materials such as polyvinyl chloride, thermoplastic olefins, thermoplastic elastomers, polypropylene and the like. Alternatively, the first mold material 26 and the second mold material 40 are dissimilar materials that are weld compatible, such as different grades of polyvinyl chloride, polypropylene and the like, wherein the materials 26 and 40 each have substantially equal melting points. Alternatively, the first mold material 26 and the second mold material 40 are dissimilar weld compatible materials wherein only a mechanical connection is achieved if the materials form a poor chemical bond including, but not limited to, nylon and polypropylene, acrylonitrile butadiene sytrene (ABS) and polypropylene, polycarbonate ABS and polypropylene or other known material combinations.

Figure 4:
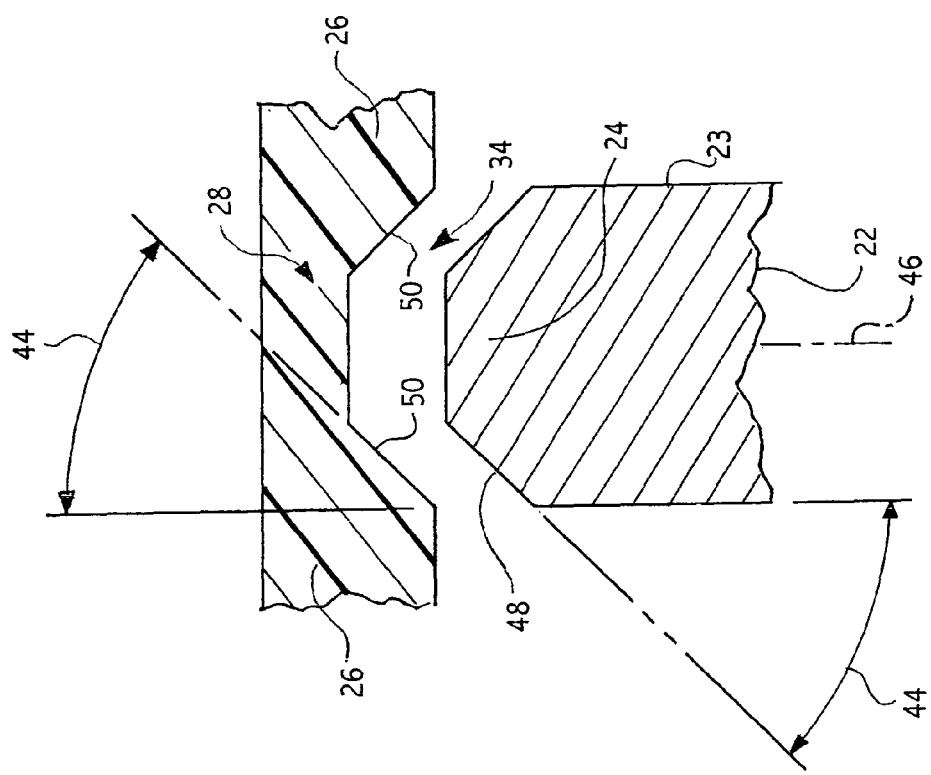
FIG. 4 is a fragmentary cross sectional view in an enlarged scale of the encircled portion 4 in FIG. 2.

The type of connection 42 formed between the first 26 and second 40 mold materials is determined by the profile of the void 34, which is in turn determined by the profile of the free end 24 of the pin 22. Preferably, the connection 42 is a tapered dovetail mechanical-type connection and a connection angle 44, best seen in FIG. 4, is formed between a longitudinal axis 46 of the pin 22 and a plane parallel to a tapered exterior surface 48 of the free end 24 of the pin 22. The connection angle 44 is preferably between about five and about thirty degrees but may be less than five or greater than thirty degrees depending on the requirements of the molded part 38. Alternatively, the connection 42 is any other desired construction that forms a mechanical connection between the first 26 and second 40 mold materials of the molded part 38.

Figure 5:
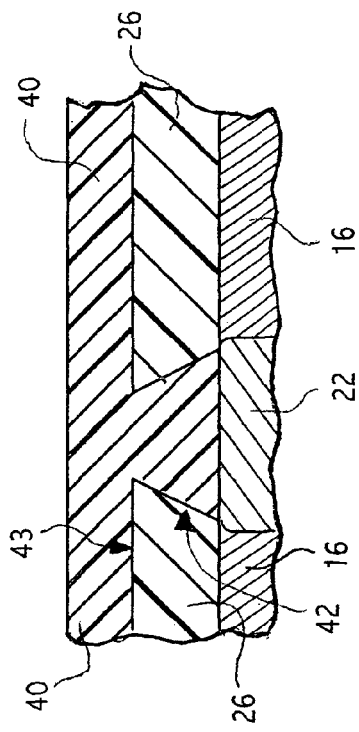
FIG. 5 is a fragmentary cross sectional view in an enlarged scale of the encircled portion 5 in FIG. 3.

Alternatively, the connection 42 is a chemical bond connection by virtue of the identical, weld compatible, or dissimilar weld compatible first mold material 26 and second 40 mold materials. For example, bonding may occur at an interface location 43 between upper and lower surfaces, respectively, of the first mold material 26 and the second mold material 40. The bonding that occurs between the dissimilar weld compatible materials may not be as robust as the bonding that occurs between identical materials. Best seen in FIGS. 4 and 5, when the second mold material 40 melts the thin wall portion 28, the second mold material 40 also melts a portion of a wall 50 of the first mold material 26 adjacent the void 34, welding the first and second mold materials 26 and 40 and forming a robust chemical bond between the mold materials 26 and 40. The connection 42 may or may not include the dovetail connection angle 44 when the connection 42 is a chemical bond connection. Alternatively, the connection 42 is a combination of the chemical bond connection between the wall 50 and the second mold material 40 and of the dovetail mechanical connection, including a dovetail connection angle 44 as shown in FIG. 4 and the chemical bond region as shown in FIG. 5.

Figure 6:
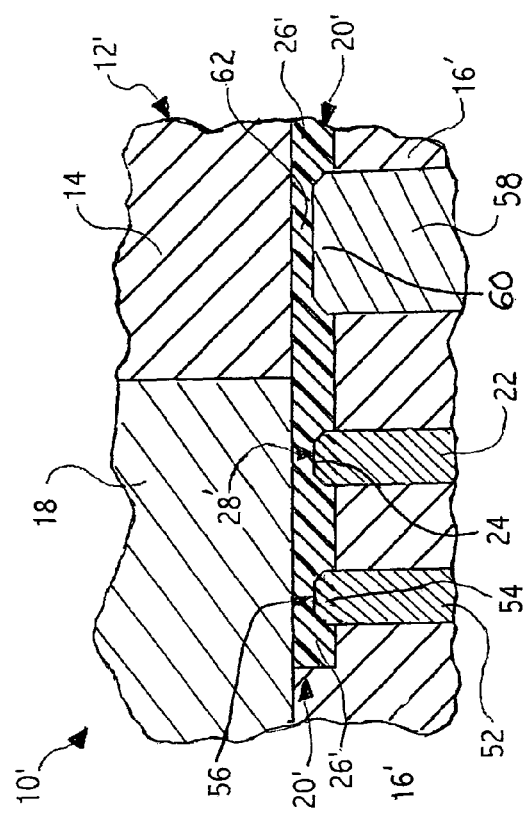
FIG. 6 is a partial cross sectional view of an alternative embodiment of a molding assembly in accordance with the present invention shown in a first configuration with a first molding material.

Referring now to FIG. 6, an alternative embodiment of a molding apparatus in accordance with the present invention is shown in a first configuration similar to the first configuration of FIG. 1 and is indicated generally at 10'. The apparatus 10' is similar to the apparatus 10 of FIG. 1 but includes a second pin 52 and a blade 58 retractably disposed in a second portion 16' of a mold system 12' thereof adjacent the pin 22. A free end 60 of the blade 58 has a greater width than a free end 54 of the pin 52 and the free end 24 of the pin. The free end 54 of the pin 52, the free end 60 of the blade 58, and the free end 24 of the pin 22 extend into a mold cavity 20'. The mold system 12' also includes a third portion 18' retractably or slidably disposed between the second portion 16' and the first portion 14 thereof. The boundaries of the mold cavity 20', therefore, are defined by the surfaces of the portions 14, 16', and 18', the free end 24 of the pin 22 and the free end 54 of the pin 52, and the free end 60 of the blade 58 adjacent the mold cavity 20'.

A first pressurized mold material 26' is injected in a molten state into the mold cavity 20' by an injector (not shown) or the like. The boundaries of the first mold material 26' are defined by the surfaces of the portions 14, 16' and 18', the free end 24 of the pin 22, the free end 54 of the pin 52, and the free end 60 of the blade 58 adjacent the mold cavity 20'. A thin wall portion 28' of the first mold material 26' is formed adjacent the free end 24 of the pin 22, and a thin wall portion 56 is formed adjacent the free end 54 of the pin 52. A thin wall portion 62 is formed adjacent the free end 60 of the blade 58 that is wider than the thin wall portions 28' and 56. The molten first mold material 26' solidifies and occupies the mold cavity 26' to form a first portion of the injection molded part.

In operation, the assembly 10' functions in a manner similar to the assembly 10 such that when the pins 22 and 52, the blade 58, and the third portion 18' are retracted after a first mold material 26' is injected, three open cavities or voids (not shown), similar to the void 34 of FIG. 2, are formed each having the thin wall portions 28', 56, and 62 adjacent the mold cavity 20'. The assembly 10' is placed in a second configuration similar to the second configuration of FIG. 2. When the second mold material (not shown) similar to the second mold material 40 of FIG. 3, is injected into a second open cavity portion (not shown) of the mold cavity 20', the second mold material melts the thin wall portions 28', 56, and 62 over each open cavity or void to form a plurality of connections, such as the connection 42, between the first mold material 26' and the second mold material. The connection formed by the thin wall portion 62 is wider than the connections formed by the thin wall portions 28' and 56 for providing a connection of greater strength.

Figure 7:
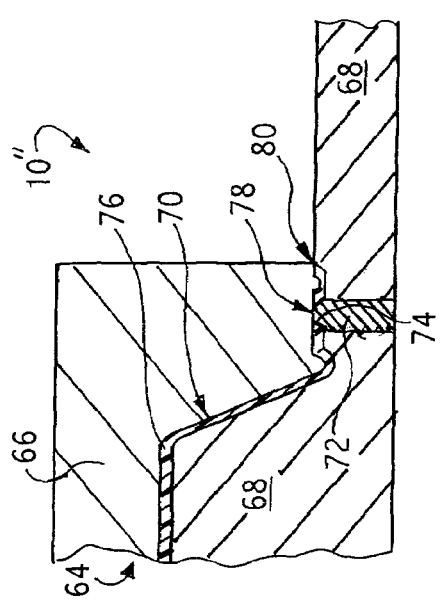

Referring now to FIG. 7, an alternative embodiment of an assembly in accordance with the present invention is shown in a first configuration and indicated generally at 10". The assembly 10" includes a mold system 64 having a first mold portion 66 and a second mold portion 68. The mold system 64 is preferably formed of steel, cast iron, or the like. The first portion 66 and the second portion 68 of the mold system 64 define a mold cavity 70 therebetween. The mold system 64 and the mold cavity 70 are preferably components of an injection molding machine for producing injection molded parts or the like. The second mold portion 68 includes a pin 72 that is retractably disposed therein. A free end 74 of the pin 72 extends into the mold cavity 70. The boundaries of the mold cavity 70, therefore, are set by the surfaces of the portions 66 and 68, and the free end 74 of the pin 72 adjacent the mold cavity 20.

A first pressurized mold material 76, similar to the mold materials 26 and 26', is injected in a molten state into the mold cavity 70 by an injector (not shown) or the like. The boundaries of the first mold material 76 are set by the surfaces of the first portion 66, the second portion 68, and the free end 74 of the pin 72 adjacent the mold cavity 70. A thin wall portion 78 of the first mold material 76 is formed adjacent the free end 74 of the pin 72 having a thickness corresponding to the spacing between the free end 74 of the pin 72 and the first portion 66. The molten first mold material 76 solidifies and occupies the mold cavity 70 to form a first portion 80 of the injection molded part.

Figure 8:
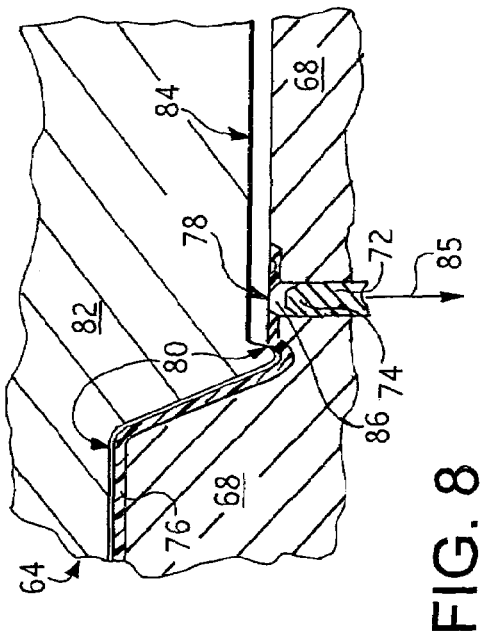
FIG. 8 is a partial cross sectional view of the molding assembly of FIG. 7 shown in a second configuration.

Referring now to FIG. 8, the assembly 10" is shown in a second configuration after the first mold material 76 has at least partially solidified. The pin 72 and the second mold portion 68 have been moved away from the first portion 66 and are now disposed adjacent a third portion 82 of the mold system 64. Preferably, the mold system 64 is part of a rotating platen injection molding machine (not shown) or similar machine, wherein the second mold portion 68 and the first portion 80 of the injection molded part are rotated away from the first portion 66. The second mold portion 68 and the third portion 82 define a mold cavity 84 therebetween.

The pin 72 is retracted away from the first mold material 76 and the first portion 68 in a retracting direction 85. The first mold material 76 is held in place by the portions 68 and 82 of the mold system 64. When the pin 72 is retracted from the first mold material 76, an open cavity or void 86 is formed between the free end 74 of the pin 72 and the thin wall portion 78. When the first mold material 76 are disposed adjacent the third portion 82, the thin wall portion 78 of the first mold material 76 is exposed to the open mold cavity 84. The boundaries of the mold cavity 84, therefore, are defined by the surfaces of the second portion 68, and the third portion 82, and by an upper surface the first mold material 76 adjacent the mold cavity 84. The thin wall portion 78 of the first mold material 76 in the second configuration, therefore, is exposed on the upper surface to the open mold cavity 84 and on a lower surface to the open cavity or void 86.

When a second mold material (not shown), similar to the second mold material 40 of FIG. 3, is injected into the open mold cavity 84, the second mold material melts the thin wall portion 78 over the open cavity or void 86 to form a plurality of connections, such as the connection 42, between the first mold material 76 and the second mold material.

Figure 9:
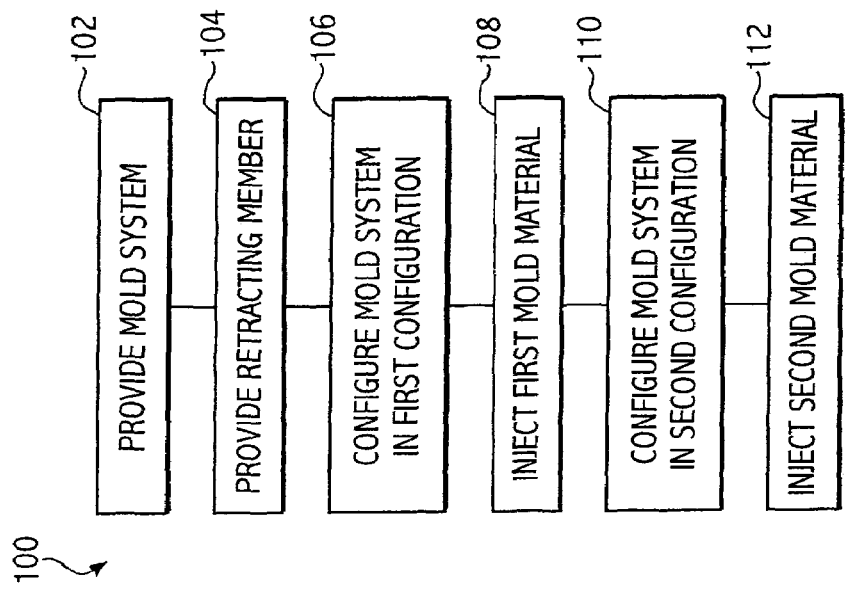
FIG. 9 is a flowchart is a flowchart of a method for creating a multi-shot molded part in accordance with the present invention.

Referring now to FIG. 9, a method in accordance with the present invention, indicated generally at 100, may be practiced by utilizing the following steps: providing a mold system in a step 102 having a mold cavity therein, the mold system being configurable in at least a first and a second configuration; providing at least one retracting member (such as a pin or a blade) projecting into the mold cavity in a step 104, the at least one retracting member being selectively movable between extended and retracted positions in the mold cavity; configuring the mold system in the first configuration in a step 106 with the retracting member in the extended position; injecting a first mold material into the mold cavity in a step 108 to form a first portion of a molded part, the first portion of the molded part including a thin wall portion adjacent the at least one retracting member; configuring the mold system in the second configuration in a step 110 with the retracting member in the retracted position to form a second portion of the molded part, the second configuration providing open cavity portions adjacent both surfaces of the thin wall portion; and injecting at least a second mold material in a step 112 into the mold cavity to form a second portion of the molded part, the second molding material penetrating the thin wall portion and filling the open cavity portions, forming a connection between the first and second portions of the molded part.

Because the pins 22, 52, 72, and the blade 58 do not extend above the surface of the first mold material 26, 26', and 76 to impact the surface of the third portions 18, 18' and 82, the exterior surface of the finished injection molded part 38 advantageously does not exhibit any defects such as a witness mark or the like on an exterior surface (not shown) thereof.

In accordance with the provisions of the patent statutes, the present invention has been described in what is considered to represent its preferred embodiment. However, it should be noted that the invention can be practiced otherwise than as specifically illustrated and described without departing from its spirit or scope. For example, while the present invention has been described utilizing a two step injection molding process, those skilled in the art will realize that the present invention may be utilized for multi-step (for example, three or more steps) injection molding processes without departing from the scope of the present invention.

What is claimed is:

1. A method for creating a molded part, comprising the steps of:
   a) providing a mold system having a mold cavity therein, said mold system being configurable in a first and a second configuration;
   b) providing a retracting member having an end and being selectively movable between extended and retracted positions in said mold cavity;
   c) configuring said mold system in said first configuration with said retracting member in said extended position such that said end is spaced from a surface of the mold system;
   d) injecting a first mold material into the mold cavity to form a first portion of a molded part, the first portion of the molded part including a wall portion defined between the end of said retracting member and the surface of the mold system;
   e) configuring said mold system in said second configuration with said retracting member in said retracted position, said second configuration providing first and second cavity portions separated by said wall portion; and
   f) injecting a second mold material into the mold cavity to form a second portion of the molded part, the second mold material removing the wall portion and filling said first and second cavity portions and the space occupied by said wall portion with the second mold material, forming a connection between the first and second portions of the molded part.

2. The method according to claim 1 wherein the step e) is performed by retracting a portion of said mold system away from said mold cavity.

3. The method according to claim 1 wherein the step e) is performed by moving a portion of said mold system and said first portion of said molded part adjacent another mold cavity.

4. The method according to claim 1 wherein said at least one retracting member is disposed in a retracting member cavity and an exterior surface of said at least one retracting member is treated, prior to the step b), to have a one of an improved lubricity property, an increased metal hardness property, and a reduced metal hardness property relative to an interior surface of a retracting member cavity.

5. The method according to claim 1 wherein said at least one retracting member is disposed in a retracting member cavity and an interior surface of a retracting member cavity is treated, prior to the step b), to have a one of an improved lubricity property, an increased metal hardness property, and a reduced metal hardness property relative to an exterior surface of said at least one retracting member.

6. The method according to claim 1 wherein said first and second molding materials are dissimilar materials.

7. The method according to claim 1 where said first and second mold materials are dissimilar weld compatible materials.

8. The method according to claim 1 wherein the connection formed between the first and second portions of the molded part is a one of a mechanical connection, a chemical bond connection, and a combination mechanical connection and chemical bond connection.

9. The method according to claim 1 wherein the connection formed between the first and second portions of the molded part is a dovetail connection.

10. A method for creating a molded part, comprising the steps of:
    a) providing a first portion of a part including a wall portion, said first portion formed of a first material;
    b) providing a mold system having a mold cavity therein;
    c) positioning said first portion within said mold cavity such that said wall portion separates a first cavity portion from a second cavity portion; and
    d) injecting a second material into said mold cavity to form a second portion of said part, said second material removing said wall portion of said first portion such that the first and second cavity portions and the space occupied by said wall portion are filled with said second material, forming a connection between said first and second portions of said part.

11. The method according to claim 10, wherein said first material and said second material are dissimilar materials.

12. The method according to claim 10, wherein said first material and said second material are weld compatible materials.

13. The method according to claim 10, wherein the connection formed between said first portion and said second portion of said part is a one of a mechanical connection, a chemical bond connection, and a combination mechanical connection and chemical bond connection.

14. The method according to claim 10 wherein the connection formed between said first portion and said second portion of said part is a dovetail connection.

15. The method according to claim 10 wherein said mold system is configurable in at least a first and a second configuration and said first portion of said part is formed by injecting said first material into said mold cavity as formed by said mold system in said first configuration.

16. The method according to claim 15 wherein said mold system includes at least one retracting member projecting into said mold cavity, said at least one retracting member being movable to an extended position when said mold system is in said first configuration and to a retracted position when said mold system is in said second configuration.

17. The method according to claim 16 wherein said wall portion of said first portion is formed adjacent said at least one retracting member.

18. The method according to claim 17 wherein step (c) consists of retaining said first portion within said mold cavity and configuring said mold system in said second configuration.

19. A method for creating a molded part, comprising the steps of:
   a) providing a mold system having first and second mold portions defining a mold cavity therebetween;
   b) providing a retracting member disposed in the first mold portion and having an outer free end being selectively movable between extended and retracted positions in the mold cavity;
   c) positioning the retracting member in its extended position such that the end is spaced from a surface of the second mold portion;
   d) injecting a first mold material into the mold cavity to form a first portion of a molded part, the first portion of the molded part including a wall portion defined between the end of the retracting member and the surface of the second mold portion;
   e) positioning the first and second mold portions relative to one another to form a second mold cavity;
   f) positioning the retracting member in its retracted position to form a void between the wall portion and the end of the retracting member, wherein the wall portion separates the second mold cavity from the void; and
   g) injecting a second mold material into the second mold cavity to form a second portion of the molded part, the second mold material removing the wall portion and filling the second mold cavity, the void, and the space occupied by the wall portion with the second mold material, forming a connection between the first and second portions of the molded part.

* * * * *